(12) United States Patent
Vijayakumar et al.

(10) Patent No.: US 10,464,595 B2
(45) Date of Patent: Nov. 5, 2019

(54) SYSTEM AND METHOD FOR CONTROLLING AN ELECTRIC POWER STEERING MOTOR

(71) Applicant: GM GLOBAL TECHNOLOGY OPERATIONS LLC, Detroit, MI (US)

(72) Inventors: Ramakrishna Vijayakumar, Oak Park, MI (US); George E. Doerr, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 182 days.

(21) Appl. No.: 15/647,668

(22) Filed: Jul. 12, 2017

(65) Prior Publication Data

US 2019/0016375 A1     Jan. 17, 2019

(51) Int. Cl.
*B62D 5/04* (2006.01)
*B62D 3/12* (2006.01)
*B60G 17/016* (2006.01)
*B62D 15/02* (2006.01)

(52) U.S. Cl.
CPC ....... *B62D 5/0463* (2013.01); *B60G 17/0162* (2013.01); *B62D 3/12* (2013.01); *B62D 5/046* (2013.01); *B62D 15/0225* (2013.01)

(58) Field of Classification Search
CPC ........ B62D 5/0463; B62D 5/046; B62D 3/12; B62D 15/0225; B60G 17/0162; B60G 17/0262

USPC ........................................................ 180/446
See application file for complete search history.

(56) References Cited

U.S. PATENT DOCUMENTS

| | | | | |
|---|---|---|---|---|
| 7,828,111 | B2 * | 11/2010 | Yamashita | B62D 5/0481 180/443 |
| 8,150,582 | B2 * | 4/2012 | Blommer | B62D 6/008 180/446 |
| 2003/0120404 | A1 * | 6/2003 | Endo | B62D 5/0463 701/41 |
| 2017/0080973 | A1 * | 3/2017 | Lickfold | B62D 15/029 |
| 2017/0267277 | A1 * | 9/2017 | Ohashi | B62D 3/123 |

\* cited by examiner

*Primary Examiner* — Joseph M Rocca
*Assistant Examiner* — Felicia L. Brittman
(74) *Attorney, Agent, or Firm* — Lorenz & Kopf, LLP

(57) ABSTRACT

Systems and methods for controlling an electric power steering (EPS) motor of an EPS system of a vehicle are provided. A steering rack position sensor detects a linear position of a steering rack linear of the EPS system and a suspension travel sensor detects a suspension travel of the vehicle. An EPS controller has a processor and a memory. The EPS controller is configured to control the current draw of the EPS motor. The EPS controller is further configured to determine an EPS motor output torque based on the linear position of the steering rack and the suspension travel, and to limit the current draw of the EPS motor based on the EPS motor output torque.

19 Claims, 3 Drawing Sheets

SYSTEM AND METHOD FOR CONTROLLING AN ELECTRIC POWER STEERING MOTOR

TECHNICAL FIELD

The technical field generally relates to motor control systems, and more particularly relates to systems and methods for controlling an electric power steering motor of a vehicle.

BACKGROUND

Modern vehicles, such as automobiles, are often equipped with electric power steering (EPS) systems. Generally, EPS systems use a motor to provide a vehicle driver with powered assistance with moving the steering rack and, in turn, angularly moves the wheels of the vehicle from a left-most position to a right-most position.

In different maneuvering situations, the EPS motor will draw different amounts of power from the battery and the vehicle's electrical system based upon the steering demand and the load on the wheels. For example, during low speed maneuvers the EPS motor will require more current to drive more torque to the steering rack than during high speed maneuvers.

As the wheels move from the left-most position to the right-most position, the steering rack moves linearly through its range of motion such that the length of the steering rack extending outwardly on each side of the steering gear changes. Equating the steering gear to a fulcrum and the portion of the steering rack extended outwardly from the steering gear to a lever arm, as the linear position of the steering rack changes, so does the magnitude of the radial forces exerted on the steering rack. For example, when the wheels are in the left-most position, one side of the steering rack will be fully extended outwardly from the steering gear. Conversely, when the wheels are in the right-most position, the same side of the steering rack will be minimally extended from the steering gear. When the steering rack is fully extended to either side of the steering gear, the steering rack is more susceptible to damage.

When the front suspension is near or at its maximum upward or downward travel, the steering tie rod is forced to have an extreme angle with respect to the rack bar. The steering tie rod transmits force from the rack bar to the suspension or vice versa and is generally coaxial to the rack bar during high force parking lot steer maneuvers. When the vehicle passes over an obstacle like a rock while traveling off road, the front suspension is compressed to nearly the limit. During such incident, if the steering rack is fully extended under the full power of the motor and vehicle operator, resultant bending stress may damage the steering rack bar.

Accordingly, it is desirable to provide systems and methods for controlling the EPS motor to prevent damage to components of the EPS. Other desirable features and characteristics of the present invention will become apparent from the subsequent detailed description and the appended claims, taken in conjunction with the accompanying drawings and the foregoing technical field and background.

SUMMARY

In one embodiment, a method for controlling an EPS motor of an EPS system of a vehicle includes detecting a linear position of a steering rack of the EPS system with a steering rack position sensor. The method further includes, but is not limited to, detecting a suspension travel of the vehicle with a suspension travel sensor. The method further includes, but is not limited to, determining an EPS motor output torque based on the linear position and the suspension travel. The method further includes, but is not limited to, limiting a current draw of the EPS motor based on the EPS motor output torque and controlling the current draw of the EPS motor to be less than the current draw.

In one embodiment, a system for controlling an EPS motor of an EPS system of a vehicle includes a battery configured to supply a current draw to the EPS system, a steering device configured to provide a steering input to the EPS system and a steering rack gear coupled to an output shaft of the EPS motor, the steering rack gear configured to drive a steering rack of the EPS system. The system further includes, but is not limited to a steering rack position sensor configured to detect a linear position of the steering rack and a suspension travel sensor configured to detect a suspension travel of at least one of a control arm or a shock of a front suspension of the vehicle. The system further includes, but it not limited to, an EPS controller having a processor and a memory, the EPS controller configured to control the current draw of the EPS motor. The system further includes, but it not limited to, an EPS motor output torque database stored in the memory, the EPS motor database has a plurality of EPS motor output torque values each corresponding to the linear position and the suspension travel. The EPS controller is configured to identify the EPS motor output torque from the EPS motor output torque database based on the linear position and the suspension travel, and to limit the current draw of the EPS motor based on the identified EPS motor output torque and the steering input.

In one embodiment a system for controlling an EPS motor of an EPS system of a vehicle is provided. The system further includes, but it not limited to, a steering rack position sensor configured to detect a linear position of a steering rack the EPS system and a suspension travel sensor configured to detect a suspension travel of the vehicle. The system further includes, but it not limited to, an EPS controller having a processor and a memory, EPS controller configured to control a current draw of the EPS motor. The EPS controller is configured to determine an EPS motor output torque based on the linear position and the suspension travel, and to limit the current draw of the EPS motor based on the EPS motor output torque.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
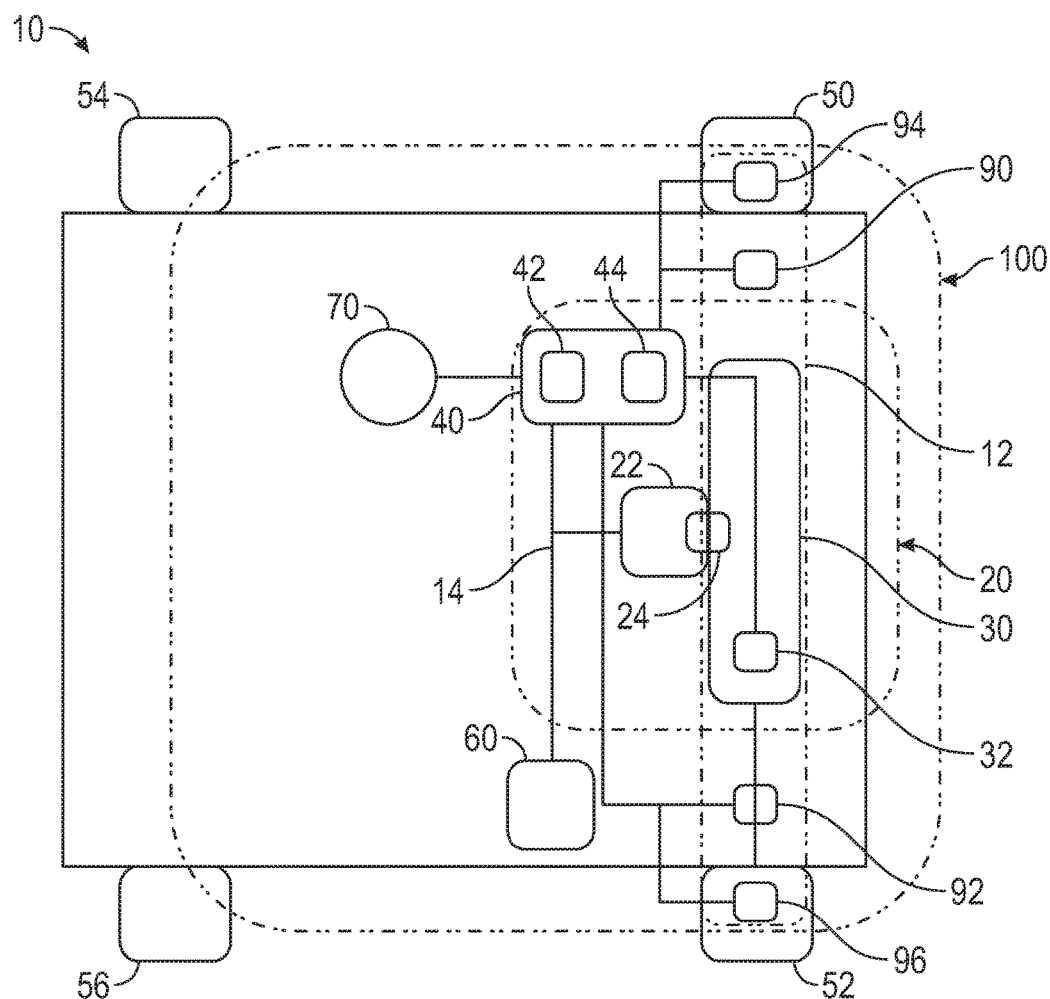
FIG. 1 illustrates a system for controlling an EPS motor of a vehicle in accordance with an exemplary embodiment.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Referring to the Figures, wherein like numerals indicate like parts throughout, a vehicle 10 having a system 100 for controlling a current draw of an EPS motor 22 of an EPS system 20 is shown herein. In the exemplary embodiments, the vehicle 10 is an automobile. However, the system 100 for the current draw of the EPS motor 22 may be implemented and/or utilized in other types of vehicles or in non-vehicle applications. As shown in FIG. 1, the vehicle 10 includes the system 100, the EPS system 20, a steering rack 30, an EPS controller 40, and wheels 50-56. The functioning of the system 100 will be made clearer when the following is read with reference to the Figures.

With reference to FIG. 1, an embodiment of the vehicle 10 having the system 100 is provided in a block diagram. The vehicle 10 includes the EPS 20. The EPS 20 generally includes the EPS motor 22, the steering rack 30, the EPS controller 40. The EPS 20 is configured to be supplied with power from a battery 60 as is known to those skilled in the art. The EPS controller 40 has a processor 42 and a memory 44. The vehicle 10 also includes a steering device 70, for example a steering wheel, and wheels 50-56.

While shown connected by lines for simplicity, one skilled in the art will appreciate that the various electronic components of the vehicle 10 may be in communication over a wired communications bus 14 or wirelessly in communication where appropriate. Furthermore, mechanical connections between components of the EPS 20 will be discussed as known to those of skill in the art.

In a non-limiting example, an operator (not shown) of the vehicle 10 uses the steering device 70 to steer the vehicle 10. The EPS 20 is instructed by the steering device 70 to turn the front wheels 50, 52 of the vehicle 10. The EPS 20 is configured to be supplied with power from the battery 60 or other electrical system as is known in the art. While the EPS 20 may turn the front wheels 50, 52 using the steering rack 30, other steering systems and arrangements that make use of a steering rack may be used as known to those skilled in the art without departing from the spirit of the disclosed system 100.

In a non-limiting embodiment, the EPS motor 22 has a steering rack gear 24 coupled to an output shaft of the EPS motor 22 to drive the steering rack 30. The steering rack gear 24 transfers the rotational torque from the EPS motor 22 to the steering rack 30 to turn the front wheels 50, 52. Non-limiting examples of the steering rack gear 24 include a worm gear, multi-gear linkage, linear drive, or other designs known to those skilled in the art to transfer the rotational torque from the EPS motor 22 into a linear actuation of the steering rack 30.

In a non-limiting embodiment, the steering rack 30 includes a steering rack position sensor 32. The steering rack position sensor 32 is configured to detect a linear position of the steering rack 30. Stated differently, the steering rack position sensor 32 detects the linear position of the steering rack which is in turn indicative of how much the front wheels 50, 52 are turned.

In a non-limiting embodiment, the EPS controller 40 is configured to control the current draw of the EPS motor 22. The EPS controller 40 further has a processor 42 and a memory 44 that are together configured to operate the control software as detailed below. The EPS controller 40 receives a steering input from the steering device 70 and controls the EPS motor 22 using electrical power from the battery 60. In a non-limiting example, the EPS controller 40 controls the current draw of the EPS motor 22 to turn the front wheels 50, 52.

In a non-limiting example, the vehicle 10 includes suspension travel sensors 90-96 which are configured to detect a suspension travel of the front suspension 12 of the vehicle 10. In a non-limiting embodiment, the system 100 includes control arm position sensors 90, 92, shock position sensors 94, 96, or a combination thereof. The control arm position sensors 90, 92 are configured to measure the position of the control arms of the front suspension 12. The shock position sensors 94, 96 are configured to measure the compression or extension of the shocks of the front suspension 12. The measurements from the suspension travel sensors 90-96 are used to determine the suspension travel according to the specific geometry and arrangement of the front suspension 12. The suspension travel position of the front suspension 12 may be obtained from various sensors including the control arm position sensors 90, 92 or the shock position sensors 94, 94. Since the suspension travel position will vary from side to side, a pair of suspension travel sensors, one on each side, are provided on the front suspension 12. One skilled in the art will appreciate that the type of suspension travel sensors 90-96 found on vehicles 10 will vary according to the specific vehicle control systems of the vehicle. In a non-limiting embodiment, the suspension travel sensors 90-96 are in communication with the EPS controller 40, shown in dotted lines, and provide the EPS controller with a measured suspension travel of the front suspension 12. Stated differently, the suspension travel position is the vertical displacement of the front wheels 50, 52 as the vehicle 10 passes over obstacles such as rocks or as the vehicle 10 travels down the roadway.

When the front suspension 12 is greatly compressed, such as when one of the front wheels 50, 52 is raised up to the maximum travel of the suspension significant stress is placed on the EPS 20. In a non-limiting example, when the vehicle 10 passes over an obstacle like a rock while traveling off road, the one or both front suspension springs 12 may become fully compressed or extended. Which in turn puts significant loading on the steering rack 30. In these off road situations, the front suspension 12 can be compressed or extended to nearly the limit and the steering rack 30 may be fully extended, such as when the front wheels 50, 52 are turned fully left or right, or at "full lock". As the steering rack 30 turns the wheels to full lock, one side of the steering rack 30 extends fully outward from the steering rack 30. Accordingly, in these steer situations, significant strain may be applied to the fully extended steering rack 30, if the motor is being commanded to apply significant assist force to the steering rack 30.

In low speed maneuvers, the EPS motor 22 needs high torque to turn the front wheels 50, 52 and therefore requires a high current draw. However, in situations where the suspension is greatly compressed or extended and the steering rack 30 is also extended to near or full travel, the rack bar is under stress beyond normal roadway operation, and the application of high torque to the steering rack 30 through the steering rack gear 24 could damage the steering rack 30 and/or the steering rack gear 24. Accordingly, in situations where the combination of extreme suspension travel and steering rack position indicate that the EPS 20 could be susceptible to damage, the system 100 limits the current draw to the EPS motor 22, thereby limiting the torque that the EPS motor 22 can transfer to the steering rack 30 through the steering rack gear 24. In this way, the system 100 reduces wear on the EPS 20 in high stress situations to improve durability.

In a non-limiting embodiment, the EPS controller 40 is configured to determine an EPS motor 22 output torque based on the linear position and the suspension travel. The EPS controller 40 then limits the current draw of the EPS motor 22 based on the EPS motor 22 output torque and controls the EPS motor 22 to provide assist to turn the front wheels 50, 52.

In a non-limiting embodiment, the system further includes an EPS motor 22 output torque database stored in the memory 44. The EPS motor 22 output torque database includes a plurality of EPS motor 22 output torque values that each correspond to the linear position and the suspension travel. In a non-limiting example, the EPS motor 22 output torque database is a lookup table that is populated with EPS motor 22 output torque values that are predetermined based on the specific vehicle 10, EPS system 20, front suspension 12, and other design considerations.

In a non-limiting embodiment, the EPS controller 40 is further configured to identify the EPS motor 22 output torque from the EPS motor output torque database based on the linear position and the suspension travel. In this way, the system 100 is able to determine if the current state of the steering rack 30 and degree of suspension travel necessitates limiting the EPS motor 22 output torque by reducing the current draw. One skilled in the art will appreciate that the EPS motor 22 output torque may be limited to varying degrees based on the current state of the steering rack 30 and degree of suspension travel. For example, the degree to which the output torque is limited may increase near complete suspension travel of the front suspension 12 or when the steering rack 30 is at full steer, while the output torque may be less limited when the front suspension 12 is not fully compressed or when the steering rack 30 is not at full steer.

In a non-limiting embodiment, the EPS motor 22 output torque is based on a bending distance of the steering rack 30. As detailed above, when the steering rack 30 greatly extended, such as during full steer turning, additional stress is placed on the extended portion of the steering rack 30 arm (not shown) of the steering rack 30. In a non-limiting embodiment, the EPS motor 22 output torque database includes bending distance measurements for the steering rack 30.

In a non-limiting embodiment, the EPS controller 40 is further configured to limit the current draw of the EPS motor 22 based on the steering input from the steering device 70. For example, in a situation where the EPS system 20 is stressed due to suspension travel and steering rack position, if the operator quickly turns the steering wheel 70, indicating a desire for rapid turning of the wheels 50, 52, the EPS controller 40 limits the current draw of the EPS motor 22 based on the steering input to prevent damaging the EPS system 20.

In a non-limiting embodiment, the EPS controller 40 is configured to further limit the current draw of the EPS motor 22 based on a driving mode of the vehicle 10. Many modern vehicles 10 have terrain selectors (not shown) that allow for the operator to indicate the type of terrain they are traversing to allow the vehicle 10 to adjust various vehicle systems. In a non-limiting embodiment, when an operator selects a rock crawl mode and indicates they will be using the vehicle 10 to traverse difficult obstacles, the system 100 limits the current draw of the EPS motor 22.

In a non-limiting embodiment, the EPS controller 40 is configured to determine a system state of the EPS system 20 and limit the current draw of the EPS motor 22 based on the determined system state. For example, the EPS controller 40 may monitor the linear position and the suspension travel and determine that the vehicle 10 is operating in an off road scenario. In this situation, the EPS controller 40 may preemptively limit the current draw of the EPS motor 22 to prevent damage to the EPS system 20.

Figure 2:
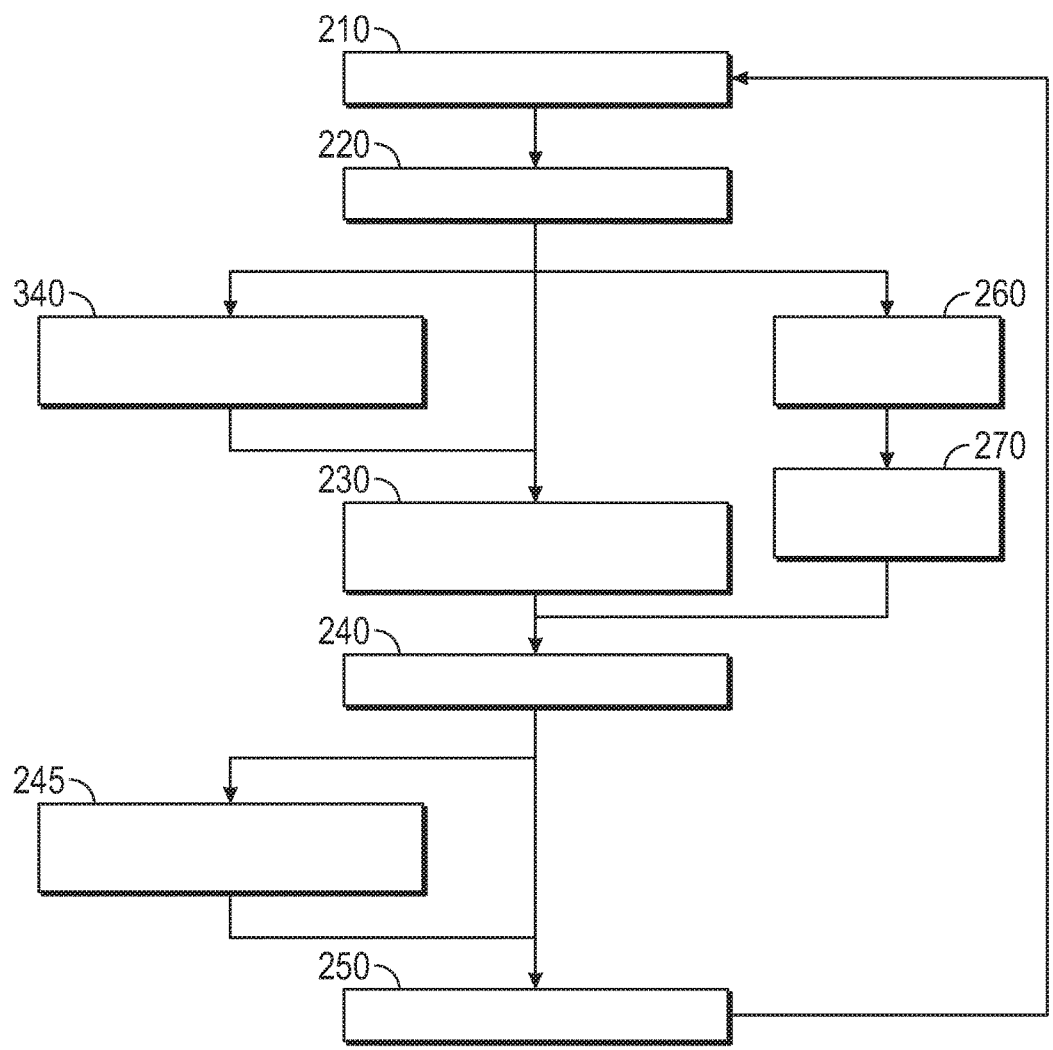
FIG. 2 illustrates a method for controlling an EPS motor of a vehicle in accordance with an exemplary embodiment.

With reference now to FIG. 2 and with continued reference to FIG. 1, a method 200 for controlling the EPS motor 22 of the EPS system 20 of the vehicle 10 is provided. As can be appreciated in light of the disclosure, the order of operation within the method 200 is not limited to the sequential execution as illustrated in FIG. 2, but may be performed in one or more varying orders as applicable and in accordance with the requirements of a given application.

In various exemplary embodiments, the system 100 and method 200 are operated based on predetermined events, such as the vehicle 10 starting or turning. Method 200 may be performed by the EPS controller 40 of the system 100 or may be performed by any other suitable device or system configured in a manner consistent with the teachings of the present disclosure. Unless otherwise noted, the method 200 may be performed by any of the embodiments of the system 100 previously described above.

The method 200 starts and at step 210, a steering rack position sensor detects a linear position of the steering rack of the EPS system. In a non-limiting embodiment, the steering rack position sensor 32 detects the linear position of the steering rack 30 of the EPS system 20 and communicates the linear position to the EPS controller 40. At step 220, s suspension travel sensor detects a suspension travel of the vehicle. In a non-limiting embodiment, a suspension travel sensor 90-96 detects a suspension travel of the vehicle 10 and communicates the suspension travel position to the EPS controller 40.

At step 230, the method 200 determines an EPS motor 22 output torque based on the linear position and the suspension travel. In a non-limiting embodiment, the EPS controller 40 determines the EPS motor 22 output torque based on the linear position and the suspension travel.

The method 200 proceeds to 240 and limits a current draw of the EPS motor based on the EPS motor output torque. In a non-limiting embodiment, the EPS controller 40 limits a current draw of the EPS motor 22 based on the EPS motor output torque. Following 240, the method 200 optionally includes 245 and adjusts the current draw based upon a system state as will be detailed below. In a non-limiting embodiment, the EPS controller 40 adjusts the current draw based upon a system state based on the state of the EPS system 20, the steering device 70, or the driving mode of the vehicle.

At 250, the method 200 controls the current draw of the EPS motor to be less than the current draw limit. In a non-limiting embodiment, the EPS controller 40 controls the current draw of the EPS motor 22 to be less than the current draw limit. Following 250, the method returns to 210 and detects the steering rack position.

In a non-limiting embodiment, the method 200 further includes 260 and provides an EPS motor output torque database having a plurality of EPS motor output torque values each corresponding to the linear position and the suspension travel. In a non-limiting embodiment, the EPS motor output torque database is stored in the memory 44 of the EPS controller 40. Following 260, at 270 the method 200 identifies the EPS motor output torque from the EPS motor output torque database based on the linear position and the suspension travel. After 270, the method 200 continues to 240.

Figure 3A:
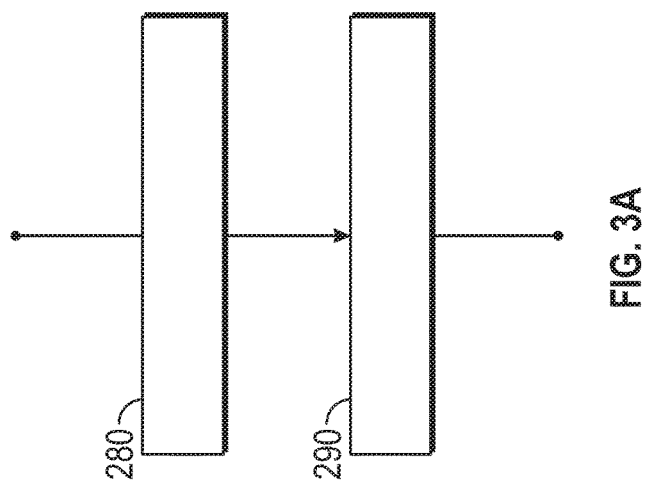
FIGS. 3A-3C illustrate alternative methods for adjusting the current draw of the EPS motor based upon a system state.
Figure 3B:
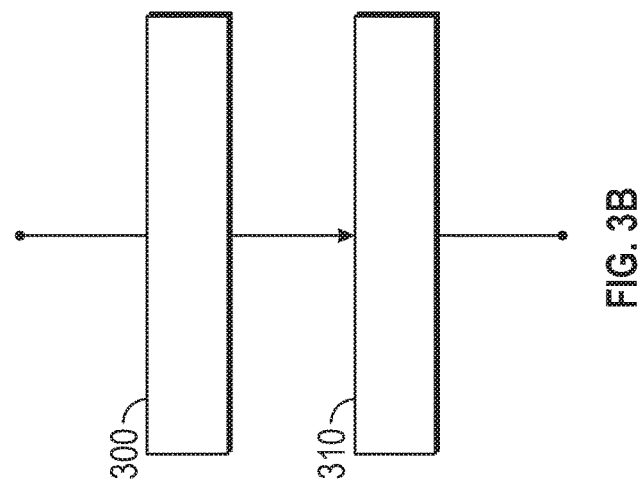
Figure 3C:
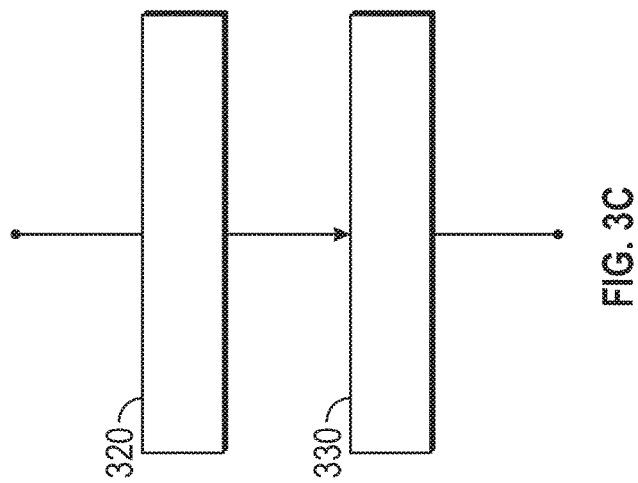

Now with reference to FIGS. 3A-3C and with continued reference to FIGS. 1-2, in a non-limiting embodiment, following 240 the method 200 adjusts the current draw based upon a system state, such as the state of the EPS system 20, the steering input from the steering device 70, or the driving mode of the vehicle 10.

As shown in FIG. 3A, in a non-limiting embodiment, the method 200 further includes 280 and determines a driving mode of the vehicle. As detailed above with respect to the system 100, the driving mode of the vehicle may be used to indicate the type of terrain the vehicle is traversing. For example, when the vehicle 10 is in a rock crawl mode, the method may further limit the current draw based on the driving mode being a rock crawl mode. Therefore, at 280 the method 200 determines the driving mode of the vehicle and proceeds to 290 and limits the current draw of the EPS motor additionally based on the driving mode. Following 290, the method 200 proceeds to 250.

As shown in FIG. 3B, in a non-limiting embodiment, the method 200 further includes 300 and receives a steering input to the EPS system. In a non-limiting embodiment, the EPS controller 40 receives a steering input from the steering device 70. Following 300, the method 200 proceeds to 310 and limits the current draw of the EPS motor 22 based on the steering input. Following 310 the method 200 proceeds to 250.

As shown in FIG. 3C, in a non-limiting embodiment, the method 200 further includes 320 and determines a state of the EPS system 20 and at 330, the method 200 limits the current draw of the EPS motor 22 based on the state of the EPS system 20. As detailed above with respect to the system 100, the EPS controller 40 may monitor the linear position and the suspension travel and determine that the vehicle 10 is operating in an off road scenario. In this situation, the EPS controller 40 may preemptively limit the current draw of the EPS motor 22 to prevent damage to the EPS system 20. Accordingly, at 320, the method 200 determines that the EPS system is operating in an off road state and then proceeds to 330 and limits the current draw based on the state of the EPS system. Following 330, the method proceeds to 250

While the embodiments from FIGS. 3A-3C have each been described as optional steps in block 245 of the method 200, one skilled in the art will appreciate that these embodiments may be combined as necessary. For example, the EPS controller 40 may implement any combination of the current limiting described in FIGS. 3A-3C in block 245 prior to controlling the EPS motor 22.

In a non-limiting embodiment, the method 200 further includes 340 and detects the suspension position with at least one of a control arm position sensor or a shock position sensor. In a non-limiting embodiment, the control arm position sensors 90, 92 detect a control arm position or the shock position sensors 94, 96 detect a shock position. Following 340, the method 200 proceeds to 230.

While various exemplary embodiments have been presented in the foregoing detailed description, it should be appreciated that a vast number of variations exist. It should also be appreciated that the exemplary embodiments are only examples, and are not intended to limit the scope, applicability, or configuration of the disclosure in any way. Rather, the foregoing detailed description will provide those skilled in the art with a convenient road map for implementing the exemplary embodiments. It should be understood that various changes can be made in the function and arrangement of elements without departing from the scope of the disclosure as set forth in the appended claims and the legal equivalents thereof.

What is claimed is:

1. A method for controlling an electric power steering (EPS) motor of an EPS system of a vehicle comprising:
   detecting a linear position of a steering rack of the EPS system with an EPS steering rack position sensor;
   detecting a suspension travel of the vehicle with a suspension travel sensor;
   determining an EPS motor output torque based on the linear position and the suspension travel;
   limiting a current draw of the EPS motor based on the EPS motor output torque; and
   controlling the EPS motor based on the current draw.

2. The method of claim 1, further comprising:
   providing an EPS motor output torque database having a plurality of EPS motor output torque values each corresponding to the linear position and the suspension travel; and
   identifying the EPS motor output torque from the EPS motor output torque database based on the linear position and the suspension travel.

3. The method of claim 1, further comprising:
   determining a system state of the EPS system; and
   limiting the current draw of the EPS motor based on the determined system state.

4. The method of claim 1, further comprising:
   receiving a steering input to the EPS system; and
   limiting the current draw of the EPS motor based on the steering input.

5. The method of claim 1, further comprising:
   limiting the current draw of the EPS motor when the vehicle is in a rock crawl mode.

6. The method of claim 1, further comprising:
   detecting the suspension travel with at least one of a control arm position sensor or a shock position sensor.

7. A system for controlling an electric power steering (EPS) motor of an EPS system of a vehicle comprising:
   a battery configured to supply a current draw to the EPS system;
   a steering device configured to provide a steering input to the EPS system;
   a steering rack gear coupled to an output shaft of the EPS motor, the steering rack gear configured to drive a steering rack of the EPS system;
   an EPS steering rack sensor configured to detect a linear position of the steering rack;
   a suspension travel sensor configured to detect a suspension travel of at least one of a control arm or a shock of a front suspension of the vehicle;
   an EPS controller having a processor and a memory, the EPS controller configured to control the current draw of the EPS motor; and
   an EPS motor output torque database stored in the memory, the EPS motor output torque database having a plurality of EPS motor output torque values each corresponding to the linear position and the suspension travel,
   wherein the EPS controller is configured to identify the EPS motor output torque from the EPS motor output torque database based on the linear position and the suspension travel, and to limit the current draw of the EPS motor based on the identified EPS motor output torque and the steering input.

8. The system of claim 7, wherein the EPS controller is configured to further limit the current draw of the EPS motor when the vehicle is in a rock crawl mode.

9. The system of claim 7, wherein the EPS controller is further configured to determine a system state of the EPS system and limit the current draw of the EPS motor based on the determined system state.

10. A system for controlling an electric power steering (EPS) motor of an EPS system of a vehicle comprising:
    a steering rack position sensor configured to detect a linear position of a steering rack of the EPS system;
    a suspension travel sensor configured to detect a suspension travel of the vehicle; and
    an EPS controller having a processor and a memory, the EPS controller configured to control a current draw of the EPS motor,
    wherein the EPS controller is configured to determine an EPS motor output torque based on the linear position and the suspension travel position, and to limit the current draw of the EPS motor based on the EPS motor output torque.

11. The system of claim 10, further comprising:
    an EPS motor output torque database stored in the memory, the EPS motor output torque database having a plurality of EPS motor output torque values each corresponding to the linear position and the suspension travel,
    wherein the EPS controller is configured to identify the EPS motor output torque from the EPS motor output torque database based on the linear position and the suspension travel, and to limit the current draw of the EPS motor based on the identified EPS motor output torque.

12. The system of claim 10, further comprising:
    a steering rack gear coupled to an output shaft of the EPS motor, the steering rack gear configured to drive the steering rack.

13. The system of claim 12, wherein the EPS motor output torque is based on a bending distance of the steering rack.

14. The system of claim 10, further comprising:
    a steering device configured to provide a steering input to the EPS system,
    wherein the EPS controller is configured to further limit the current draw of the EPS motor based on the steering input.

15. The system of claim 10, further comprising:
a battery configured to supply the current draw to the EPS system,
wherein the EPS controller is configured to further limit the current draw supplied from the battery to the EPS motor.

16. The system of claim 10, wherein the suspension travel sensor is a control arm position sensor configured to detect a position of a control arm of a front suspension of the vehicle.

17. The system of claim 10, wherein the suspension travel sensor is a shock position sensor configured to detect a position of a shock of a front suspension of the vehicle.

18. The system of claim 10, wherein the EPS controller is configured to further limit the current draw of the EPS motor when the vehicle is in a rock crawl mode.

19. The system of claim 10, wherein the EPS controller is configured to determine a system state of the EPS system and limit the current draw of the EPS motor based on the system state.

* * * * *